(12) United States Patent
Leidel et al.

(10) Patent No.: US 10,963,398 B2
(45) Date of Patent: *Mar. 30, 2021

(54) VIRTUAL REGISTER FILE

(71) Applicant: Micron Technology, Inc., Boise, ID (US)

(72) Inventors: John D. Leidel, McKinney, TX (US); Geoffrey C. Rogers, Frisco, TX (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 16/054,702

(22) Filed: Aug. 3, 2018

(65) Prior Publication Data
US 2018/0341597 A1 Nov. 29, 2018

Related U.S. Application Data

(63) Continuation of application No. 15/085,631, filed on Mar. 30, 2016, now Pat. No. 10,049,054.

(60) Provisional application No. 62/141,601, filed on Apr. 1, 2015.

(51) Int. Cl.
  *G06F 8/41* (2018.01)
  *G06F 12/1027* (2016.01)
  *G06F 12/109* (2016.01)

(52) U.S. Cl.
  CPC .......... *G06F 12/1027* (2013.01); *G06F 8/441* (2013.01); *G06F 12/109* (2013.01); *G06F 2212/65* (2013.01)

(58) Field of Classification Search
  CPC .... G06F 12/1027; G06F 12/109; G06F 8/441; G06F 2212/65

USPC ........................................................ 711/203
  See application file for complete search history.

(56) References Cited

U.S. PATENT DOCUMENTS

| | | |
|---|---|---|
| 4,380,046 A | 4/1983 | Fung |
| 4,435,792 A | 3/1984 | Bechtolsheim |
| 4,435,793 A | 3/1984 | Ochii |
| 4,727,474 A | 2/1988 | Batcher |
| 4,843,264 A | 6/1989 | Galbraith |
| 4,958,378 A | 9/1990 | Bell |

(Continued)

FOREIGN PATENT DOCUMENTS

| | | |
|---|---|---|
| CN | 102141905 | 8/2011 |
| EP | 0214718 | 3/1987 |

(Continued)

OTHER PUBLICATIONS

Boyd et al., "On the General Applicability of Instruction-Set Randomization", Jul.-Sep. 2010, (14 pgs.), vol. 7, Issue 3, IEEE Transactions on Dependable and Secure Computing.

(Continued)

*Primary Examiner* — Hashem Farrokh
(74) *Attorney, Agent, or Firm* — Brooks, Cameron & Huebsch, PLLC

(57) ABSTRACT

The present disclosure is related to a virtual register file. Source code can be compiled to include references to a virtual register file for data subject to a logical operation. The references can be dereferenced at runtime to obtain physical addresses of memory device elements according to the virtual register file. The logical operation can be performed in the memory device on data stored in the memory device elements.

12 Claims, 3 Drawing Sheets

(56) References Cited

U.S. PATENT DOCUMENTS

| | | |
|---|---|---|
| 4,977,542 A | 12/1990 | Matsuda et al. |
| 5,023,838 A | 6/1991 | Herbert |
| 5,034,636 A | 7/1991 | Reis et al. |
| 5,201,039 A | 4/1993 | Sakamura |
| 5,210,850 A | 5/1993 | Kelly et al. |
| 5,253,308 A | 10/1993 | Johnson |
| 5,276,643 A | 1/1994 | Hoffmann et al. |
| 5,325,519 A | 6/1994 | Long et al. |
| 5,367,488 A | 11/1994 | An |
| 5,379,257 A | 1/1995 | Matsumura et al. |
| 5,386,379 A | 1/1995 | Ali-Yahia et al. |
| 5,398,213 A | 3/1995 | Yeon et al. |
| 5,440,482 A | 8/1995 | Davis |
| 5,446,690 A | 8/1995 | Tanaka et al. |
| 5,473,576 A | 12/1995 | Matsui |
| 5,481,500 A | 1/1996 | Reohr et al. |
| 5,485,373 A | 1/1996 | Davis et al. |
| 5,506,811 A | 4/1996 | McLaury |
| 5,615,404 A | 3/1997 | Knoll et al. |
| 5,638,128 A | 6/1997 | Hoogenboom |
| 5,638,317 A | 6/1997 | Tran |
| 5,654,936 A | 8/1997 | Cho |
| 5,678,021 A | 10/1997 | Pawate et al. |
| 5,724,291 A | 3/1998 | Matano |
| 5,724,366 A | 3/1998 | Furutani |
| 5,751,987 A | 5/1998 | Mahant-Shetti et al. |
| 5,787,458 A | 7/1998 | Miwa |
| 5,854,636 A | 12/1998 | Watanabe et al. |
| 5,867,429 A | 2/1999 | Chen et al. |
| 5,870,504 A | 2/1999 | Nemoto et al. |
| 5,915,084 A | 6/1999 | Wendell |
| 5,920,881 A | 7/1999 | Porterfield |
| 5,935,263 A | 8/1999 | Keeth et al. |
| 5,986,942 A | 11/1999 | Sugibayashi |
| 5,991,209 A | 11/1999 | Chow |
| 5,991,785 A | 11/1999 | Alidina et al. |
| 6,005,799 A | 12/1999 | Rao |
| 6,009,020 A | 12/1999 | Nagata |
| 6,092,186 A | 7/2000 | Betker et al. |
| 6,122,211 A | 9/2000 | Morgan et al. |
| 6,125,071 A | 9/2000 | Kohno et al. |
| 6,134,164 A | 10/2000 | Lattimore et al. |
| 6,147,514 A | 11/2000 | Shiratake |
| 6,151,244 A | 11/2000 | Fujino et al. |
| 6,157,578 A | 12/2000 | Brady |
| 6,163,862 A | 12/2000 | Adams et al. |
| 6,166,942 A | 12/2000 | Vo et al. |
| 6,172,918 B1 | 1/2001 | Hidaka |
| 6,175,514 B1 | 1/2001 | Henderson |
| 6,178,482 B1 | 1/2001 | Sollars et al. |
| 6,181,698 B1 | 1/2001 | Hariguchi |
| 6,208,544 B1 | 3/2001 | Beadle et al. |
| 6,226,215 B1 | 5/2001 | Yoon |
| 6,301,153 B1 | 10/2001 | Takeuchi et al. |
| 6,301,164 B1 | 10/2001 | Manning et al. |
| 6,304,477 B1 | 10/2001 | Naji |
| 6,389,507 B1 | 5/2002 | Sherman |
| 6,418,498 B1 | 7/2002 | Martwick |
| 6,466,499 B1 | 10/2002 | Blodgett |
| 6,510,098 B1 | 1/2003 | Taylor |
| 6,563,754 B1 | 5/2003 | Lien et al. |
| 6,578,058 B1 | 6/2003 | Nygaard |
| 6,731,542 B1 | 5/2004 | Le et al. |
| 6,754,746 B1 | 6/2004 | Leung et al. |
| 6,768,679 B1 | 7/2004 | Le et al. |
| 6,807,614 B2 | 10/2004 | Chung |
| 6,816,422 B2 | 11/2004 | Hamade et al. |
| 6,819,612 B1 | 11/2004 | Achter |
| 6,894,549 B2 | 5/2005 | Eliason |
| 6,943,579 B1 | 9/2005 | Hazanchuk et al. |
| 6,948,056 B1 | 9/2005 | Roth et al. |
| 6,950,771 B1 | 9/2005 | Fan et al. |
| 6,950,898 B2 | 9/2005 | Merritt et al. |
| 6,956,770 B2 | 10/2005 | Khalid et al. |
| 6,961,272 B2 | 11/2005 | Schreck |
| 6,965,648 B1 | 11/2005 | Smith et al. |
| 6,985,394 B2 | 1/2006 | Kim |
| 6,987,693 B2 | 1/2006 | Cernea et al. |
| 7,020,017 B2 | 3/2006 | Chen et al. |
| 7,028,170 B2 | 4/2006 | Saulsbury |
| 7,045,834 B2 | 5/2006 | Tran et al. |
| 7,054,178 B1 | 5/2006 | Shiah et al. |
| 7,061,817 B2 | 6/2006 | Raad et al. |
| 7,079,407 B1 | 7/2006 | Dimitrelis |
| 7,173,857 B2 | 2/2007 | Kato et al. |
| 7,187,585 B2 | 3/2007 | Li et al. |
| 7,196,928 B2 | 3/2007 | Chen |
| 7,260,565 B2 | 8/2007 | Lee et al. |
| 7,260,672 B2 | 8/2007 | Garney |
| 7,372,715 B2 | 5/2008 | Han |
| 7,400,532 B2 | 7/2008 | Aritome |
| 7,406,494 B2 | 7/2008 | Magee |
| 7,447,720 B2 | 11/2008 | Beaumont |
| 7,454,451 B2 | 11/2008 | Beaumont |
| 7,457,181 B2 | 11/2008 | Lee et al. |
| 7,535,769 B2 | 5/2009 | Cernea |
| 7,546,438 B2 | 6/2009 | Chung |
| 7,562,198 B2 | 7/2009 | Noda et al. |
| 7,574,466 B2 | 8/2009 | Beaumont |
| 7,602,647 B2 | 10/2009 | Li et al. |
| 7,663,928 B2 | 2/2010 | Tsai et al. |
| 7,685,365 B2 | 3/2010 | Rajwar et al. |
| 7,692,466 B2 | 4/2010 | Ahmadi |
| 7,752,417 B2 | 7/2010 | Manczak et al. |
| 7,791,962 B2 | 9/2010 | Noda et al. |
| 7,796,453 B2 | 9/2010 | Riho et al. |
| 7,805,587 B1 | 9/2010 | Van Dyke et al. |
| 7,808,854 B2 | 10/2010 | Takase |
| 7,827,372 B2 | 11/2010 | Bink et al. |
| 7,869,273 B2 | 1/2011 | Lee et al. |
| 7,898,864 B2 | 3/2011 | Dong |
| 7,924,628 B2 | 4/2011 | Danon et al. |
| 7,937,535 B2 | 5/2011 | Ozer et al. |
| 7,957,206 B2 | 6/2011 | Bauser |
| 7,979,667 B2 | 7/2011 | Allen et al. |
| 7,996,749 B2 | 8/2011 | Ding et al. |
| 8,042,082 B2 | 10/2011 | Solomon |
| 8,045,391 B2 | 10/2011 | Mohklesi |
| 8,059,438 B2 | 11/2011 | Chang et al. |
| 8,095,825 B2 | 1/2012 | Hirotsu et al. |
| 8,117,462 B2 | 2/2012 | Snapp et al. |
| 8,164,942 B2 | 4/2012 | Gebara et al. |
| 8,208,328 B2 | 6/2012 | Hong |
| 8,213,248 B2 | 7/2012 | Moon et al. |
| 8,223,568 B2 | 7/2012 | Seo |
| 8,238,173 B2 | 8/2012 | Akerib et al. |
| 8,274,841 B2 | 9/2012 | Shimano et al. |
| 8,279,683 B2 | 10/2012 | Klein |
| 8,310,884 B2 | 11/2012 | Iwai et al. |
| 8,332,367 B2 | 12/2012 | Bhattacherjee et al. |
| 8,339,824 B2 | 12/2012 | Cooke |
| 8,339,883 B2 | 12/2012 | Yu et al. |
| 8,347,154 B2 | 1/2013 | Bahali et al. |
| 8,351,292 B2 | 1/2013 | Matano |
| 8,356,144 B2 | 1/2013 | Hessel et al. |
| 8,417,921 B2 | 4/2013 | Gonion et al. |
| 8,462,532 B1 | 6/2013 | Argyres |
| 8,484,276 B2 | 7/2013 | Carlson et al. |
| 8,495,438 B2 | 7/2013 | Roine |
| 8,503,250 B2 | 8/2013 | Demone |
| 8,526,239 B2 | 9/2013 | Kim |
| 8,533,245 B1 | 9/2013 | Cheung |
| 8,555,037 B2 | 10/2013 | Gonion |
| 8,599,613 B2 | 12/2013 | Abiko et al. |
| 8,605,015 B2 | 12/2013 | Guttag et al. |
| 8,625,376 B2 | 1/2014 | Jung et al. |
| 8,644,101 B2 | 2/2014 | Jun et al. |
| 8,650,232 B2 | 2/2014 | Stortz et al. |
| 8,873,272 B2 | 10/2014 | Lee |
| 8,964,496 B2 | 2/2015 | Manning |
| 8,971,124 B1 | 3/2015 | Manning |
| 9,015,390 B2 | 4/2015 | Klein |
| 9,047,193 B2 | 6/2015 | Lin et al. |
| 9,104,436 B1 * | 8/2015 | Michaud .............. G06F 8/4434 |

(56) References Cited

U.S. PATENT DOCUMENTS

| | | | |
|---|---|---|---|
| 9,165,023 | B2 | 10/2015 | Moskovich et al. |
| 2001/0007112 | A1 | 7/2001 | Porterfield |
| 2001/0008492 | A1 | 7/2001 | Higashiho |
| 2001/0010057 | A1 | 7/2001 | Yamada |
| 2001/0028584 | A1 | 10/2001 | Nakayama et al. |
| 2001/0043089 | A1 | 11/2001 | Forbes et al. |
| 2002/0059355 | A1 | 5/2002 | Peleg et al. |
| 2003/0167426 | A1 | 9/2003 | Slobodnik |
| 2003/0222879 | A1 | 12/2003 | Lin et al. |
| 2004/0073592 | A1 | 4/2004 | Kim et al. |
| 2004/0073773 | A1 | 4/2004 | Demjanenko |
| 2004/0085840 | A1 | 5/2004 | Vali et al. |
| 2004/0095826 | A1 | 5/2004 | Perner |
| 2004/0154002 | A1 | 8/2004 | Ball et al. |
| 2004/0205289 | A1 | 10/2004 | Srinivasan |
| 2004/0240251 | A1 | 12/2004 | Nozawa et al. |
| 2005/0015557 | A1 | 1/2005 | Wang et al. |
| 2005/0021925 | A1 | 1/2005 | Clark et al. |
| 2005/0078514 | A1 | 4/2005 | Scheuerlein et al. |
| 2005/0097417 | A1 | 5/2005 | Agrawal et al. |
| 2005/0226337 | A1 | 10/2005 | Dorojevets et al. |
| 2006/0047937 | A1 | 3/2006 | Selvaggi et al. |
| 2006/0069849 | A1 | 3/2006 | Rudelic |
| 2006/0146623 | A1 | 7/2006 | Mizuno et al. |
| 2006/0149804 | A1 | 7/2006 | Luick et al. |
| 2006/0181917 | A1 | 8/2006 | Kang et al. |
| 2006/0215432 | A1 | 9/2006 | Wickeraad et al. |
| 2006/0225072 | A1 | 10/2006 | Lari et al. |
| 2006/0265575 | A1 | 11/2006 | Damron |
| 2006/0291282 | A1 | 12/2006 | Liu et al. |
| 2007/0094484 | A1 | 4/2007 | Rychlik |
| 2007/0103986 | A1 | 5/2007 | Chen |
| 2007/0171747 | A1 | 7/2007 | Hunter et al. |
| 2007/0180006 | A1 | 8/2007 | Gyoten et al. |
| 2007/0180184 | A1 | 8/2007 | Sakashita et al. |
| 2007/0195602 | A1 | 8/2007 | Fong et al. |
| 2007/0285131 | A1 | 12/2007 | Sohn |
| 2007/0285979 | A1 | 12/2007 | Turner |
| 2007/0291532 | A1 | 12/2007 | Tsuji |
| 2008/0025073 | A1 | 1/2008 | Arsovski |
| 2008/0037333 | A1 | 2/2008 | Kim et al. |
| 2008/0052711 | A1 | 2/2008 | Forin et al. |
| 2008/0137388 | A1 | 6/2008 | Krishnan et al. |
| 2008/0165601 | A1 | 7/2008 | Matick et al. |
| 2008/0178053 | A1 | 7/2008 | Gorman et al. |
| 2008/0215937 | A1 | 9/2008 | Dreibelbis et al. |
| 2009/0067218 | A1 | 3/2009 | Graber |
| 2009/0106478 | A1 | 4/2009 | Okin et al. |
| 2009/0154238 | A1 | 6/2009 | Lee |
| 2009/0154273 | A1 | 6/2009 | Borot et al. |
| 2009/0254697 | A1 | 10/2009 | Akerib |
| 2010/0067296 | A1 | 3/2010 | Li |
| 2010/0091582 | A1 | 4/2010 | Vali et al. |
| 2010/0172190 | A1 | 7/2010 | Lavi et al. |
| 2010/0210076 | A1 | 8/2010 | Gruber et al. |
| 2010/0226183 | A1 | 9/2010 | Kim |
| 2010/0308858 | A1 | 12/2010 | Noda et al. |
| 2010/0332895 | A1 | 12/2010 | Billing et al. |
| 2011/0051523 | A1 | 3/2011 | Manabe et al. |
| 2011/0063919 | A1 | 3/2011 | Chandrasekhar et al. |
| 2011/0093662 | A1 | 4/2011 | Walker et al. |
| 2011/0103151 | A1 | 5/2011 | Kim et al. |
| 2011/0119467 | A1 | 5/2011 | Cadambi et al. |
| 2011/0122695 | A1 | 5/2011 | Li et al. |
| 2011/0140741 | A1 | 6/2011 | Zerbe et al. |
| 2011/0219260 | A1 | 9/2011 | Nobunaga et al. |
| 2011/0267883 | A1 | 11/2011 | Lee et al. |
| 2011/0317496 | A1 | 12/2011 | Bunce et al. |
| 2012/0005397 | A1 | 1/2012 | Lim et al. |
| 2012/0017039 | A1 | 1/2012 | Margetts |
| 2012/0023281 | A1 | 1/2012 | Kawasaki et al. |
| 2012/0120705 | A1 | 5/2012 | Mitsubori et al. |
| 2012/0134216 | A1 | 5/2012 | Singh |
| 2012/0134225 | A1 | 5/2012 | Chow |
| 2012/0134226 | A1 | 5/2012 | Chow |
| 2012/0140540 | A1 | 6/2012 | Agam et al. |
| 2012/0159193 | A1* | 6/2012 | Spradlin ............... G06F 21/51 713/190 |
| 2012/0182798 | A1 | 7/2012 | Hosono et al. |
| 2012/0195146 | A1 | 8/2012 | Jun et al. |
| 2012/0198310 | A1 | 8/2012 | Tran et al. |
| 2012/0246380 | A1 | 9/2012 | Akerib et al. |
| 2012/0265964 | A1 | 10/2012 | Murata et al. |
| 2012/0281486 | A1 | 11/2012 | Rao et al. |
| 2012/0303627 | A1 | 11/2012 | Keeton et al. |
| 2013/0003467 | A1 | 1/2013 | Klein |
| 2013/0024647 | A1* | 1/2013 | Gove ................... G06F 12/084 711/207 |
| 2013/0061006 | A1 | 3/2013 | Hein |
| 2013/0107623 | A1 | 5/2013 | Kavalipurapu et al. |
| 2013/0117541 | A1 | 5/2013 | Choquette et al. |
| 2013/0124783 | A1 | 5/2013 | Yoon et al. |
| 2013/0132702 | A1 | 5/2013 | Patel et al. |
| 2013/0138646 | A1 | 5/2013 | Sirer et al. |
| 2013/0163362 | A1 | 6/2013 | Kim |
| 2013/0173888 | A1 | 7/2013 | Hansen et al. |
| 2013/0205114 | A1 | 8/2013 | Badam et al. |
| 2013/0219112 | A1 | 8/2013 | Okin et al. |
| 2013/0227213 | A1* | 8/2013 | Choi ......................... G06F 5/08 711/109 |
| 2013/0227361 | A1 | 8/2013 | Bowers et al. |
| 2013/0283122 | A1 | 10/2013 | Anholt et al. |
| 2013/0286705 | A1 | 10/2013 | Grover et al. |
| 2013/0326154 | A1 | 12/2013 | Haswell |
| 2013/0332707 | A1 | 12/2013 | Gueron et al. |
| 2014/0129799 | A1 | 5/2014 | Fleischer et al. |
| 2014/0185395 | A1 | 7/2014 | Seo |
| 2014/0215185 | A1 | 7/2014 | Danielsen |
| 2014/0250279 | A1 | 9/2014 | Manning |
| 2014/0281366 | A1* | 9/2014 | Felch ................... G06F 12/0886 711/207 |
| 2014/0344934 | A1 | 11/2014 | Jorgensen |
| 2015/0029798 | A1 | 1/2015 | Manning |
| 2015/0042380 | A1 | 2/2015 | Manning |
| 2015/0063052 | A1 | 3/2015 | Manning |
| 2015/0078108 | A1 | 3/2015 | Cowles et al. |
| 2015/0086012 | A1 | 3/2015 | Chhabra |
| 2015/0134713 | A1 | 5/2015 | Wheeler |
| 2015/0279466 | A1 | 10/2015 | Manning |
| 2015/0324290 | A1 | 11/2015 | Leidel |
| 2015/0325272 | A1 | 11/2015 | Murphy |
| 2016/0092675 | A1* | 3/2016 | Vidrine ................. G06F 21/52 726/22 |
| 2016/0179700 | A1* | 6/2016 | Venkatasubramanian ................... G06F 12/1045 711/205 |

FOREIGN PATENT DOCUMENTS

| | | |
|---|---|---|
| EP | 2026209 | 2/2009 |
| JP | H0831168 | 2/1996 |
| JP | 2009259193 | 3/2015 |
| KR | 10-0211482 | 8/1998 |
| KR | 10-2010-0134235 | 12/2010 |
| KR | 10-2013-0049421 | 5/2013 |
| WO | 2001065359 | 9/2001 |
| WO | 2010079451 | 7/2010 |
| WO | 2013062596 | 5/2013 |
| WO | 2013081588 | 6/2013 |
| WO | 2013095592 | 6/2013 |

OTHER PUBLICATIONS

Stojmenovic, "Multiplicative Circulant Networks Topological Properties and Communication Algorithms", (25 pgs.), Discrete Applied Mathematics 77 (1997) 281-305.

"4.9.3 MINLOC and MAXLOC", Jun. 12, 1995, (5pgs.), Message Passing Interface Forum 1.1, retrieved from http://www.mpi-forum.org/docs/mpi-1.1/mpi-11-html/node79.html.

Derby, et al., "A High-Performance Embedded DSP Core with Novel SIMD Features", Apr. 6-10, 2003, (4 pgs), vol. 2, pp.

(56) References Cited

OTHER PUBLICATIONS 301-304, 2003 IEEE International Conference on Accoustics, Speech, and Signal Processing.

Debnath, Biplob, Bloomflash: Bloom Filter on Flash-Based Storage, 2011 31st Annual Conference on Distributed Computing Systems, Jun. 20-24, 2011, 10 pgs.

Pagiamtzis, Kostas, "Content-Addressable Memory Introduction", Jun. 25, 2007, (6 pgs.), retrieved from: http://www.pagiamtzis.com/cam/camintro.

Pagiamtzis, et al., "Content-Addressable Memory (CAM) Circuits and Architectures: A Tutorial and Survey", Mar. 2006, (16 pgs.), vol. 41, No. 3, IEEE Journal of Solid-State Circuits.

International Search Report and Written Opinion for PCT Application No. PCT/US2013/043702, dated Sep. 26, 2013, (11 pgs.).

Elliot, et al., "Computational RAM: Implementing Processors in Memory", Jan.-Mar. 1999, (10 pgs.), vol. 16, Issue 1, IEEE Design and Test of Computers Magazine.

Dybdahl, et al., "Destructive-Read in Embedded DRAM, Impact on Power Consumption," Apr. 2006, (10 pgs.), vol. 2, Issue 2, Journal of Embedded Computing—Issues in embedded single-chip multicore architectures.

Kogge, et al., "Processing In Memory: Chips to Petaflops," May 23, 1997, (8 pgs.), retrieved from: http://www.cs.ucf.edu/courses/cda5106/summer02/papers/kogge97PIM.pdf.

Draper, et al., "The Architecture of the DIVA Processing-In-Memory Chip," Jun. 22-26, 2002, (12 pgs.), ICS '02, retrieved from: http://www.isi.edu/~draper/papers/ics02.pdf.

Adibi, et al., "Processing-In-Memory Technology for Knowledge Discovery Algorithms," Jun. 25, 2006, (10 pgs.), Proceeding of the Second International Workshop on Data Management on New Hardware, retrieved from: http://www.cs.cmu.edu/~damon2006/pdf/adibi06inmemory.pdf.

U.S. Appl. No. 13/449,082, entitled, "Methods and Apparatus for Pattern Matching," filed Apr. 17, 2012, (37 pgs.).

U.S. Appl. No. 13/743,686, entitled, "Weighted Search and Compare in a Memory Device," filed Jan. 17, 2013, (25 pgs.).

U.S. Appl. No. 13/774,636, entitled, "Memory as a Programmable Logic Device," filed Feb. 22, 2013, (30 pgs.).

U.S. Appl. No. 13/774,553, entitled, "Neural Network in a Memory Device," filed Feb. 22, 2013, (63 pgs.).

U.S. Appl. No. 13/796,189, entitled, "Performing Complex Arithmetic Functions in a Memory Device," filed Mar. 12, 2013, (23 pgs.).

Search Report and Written Opinion for related PCT Application No. PCT/US2016/025499, dated Jul. 20, 2016, 11 pages.

Extended European Search Report for related EP Application No. 16774290.7, dated Dec. 3, 2018, 10 pages.

\* cited by examiner

US 10,963,398 B2

VIRTUAL REGISTER FILE

PRIORITY INFORMATION

This application is a Continuation of U.S. application Ser. No. 15/085,631, filed Mar. 30, 2016, which issues as U.S. Pat. No. 10,049,054 on Aug. 14, 2018, which claims the benefit of U.S. Provisional Application No. 62/141,601, filed Apr. 1, 2015, the contents of which are included herein by reference.

TECHNICAL FIELD

The present disclosure relates generally to semiconductor memory and methods, and more particularly, to a virtual register file.

BACKGROUND

Memory devices are typically provided as internal, semiconductor, integrated circuits in computing devices or other electronic devices. There are many different types of memory including volatile and non-volatile memory. Volatile memory can require power to maintain its data (e.g., user data, error data, etc.) and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), such as spin torque transfer random access memory (STT RAM), among others.

Computing systems often include a number of processing resources (e.g., one or more processors), which may retrieve and execute instructions and store the results of the executed instructions to a suitable location. A processor can comprise a number of functional units (e.g., herein referred to as functional unit circuitry (FUC)) such as arithmetic logic unit (ALU) circuitry, floating point unit (FPU) circuitry, and/or a combinatorial logic block, for example, which can execute instructions to perform logical operations such as AND, OR, NOT, NAND, NOR, and XOR logical operations on data (e.g., one or more operands).

A number of components in a computing system may be involved in providing instructions to the functional unit circuitry for execution. The instructions may be generated, for instance, by a processing resource such as a controller and/or host processor. Data (e.g., the operands on which the instructions will be executed to perform the logical operations) may be stored in a memory array that is accessible by the FUC. The instructions and/or data may be retrieved from the memory array and sequenced and/or buffered before the FUC begins to execute instructions on the data. Furthermore, as different types of operations may be executed in one or multiple clock cycles through the FUC, intermediate results of the operations and/or data may also be sequenced and/or buffered. In many instances, the processing resources (e.g., processor and/or associated FUC) may be external to the memory array, and data can be accessed (e.g., via a bus between the processing resources and the memory array) to execute instructions. Data can be moved from the memory array to registers external to the memory array via a bus.

A register file is an array of processor registers in a central processing unit (CPU). Integrated circuit-based register files may be implemented, for example, by static random access memory (SRAM). The instruction set architecture of a CPU may define a set of registers used to stage data between memory and the FUC. The register file may be visible to the programmer, as opposed to the cache, which may not be visible to the programmer.

DETAILED DESCRIPTION

Figure 1:
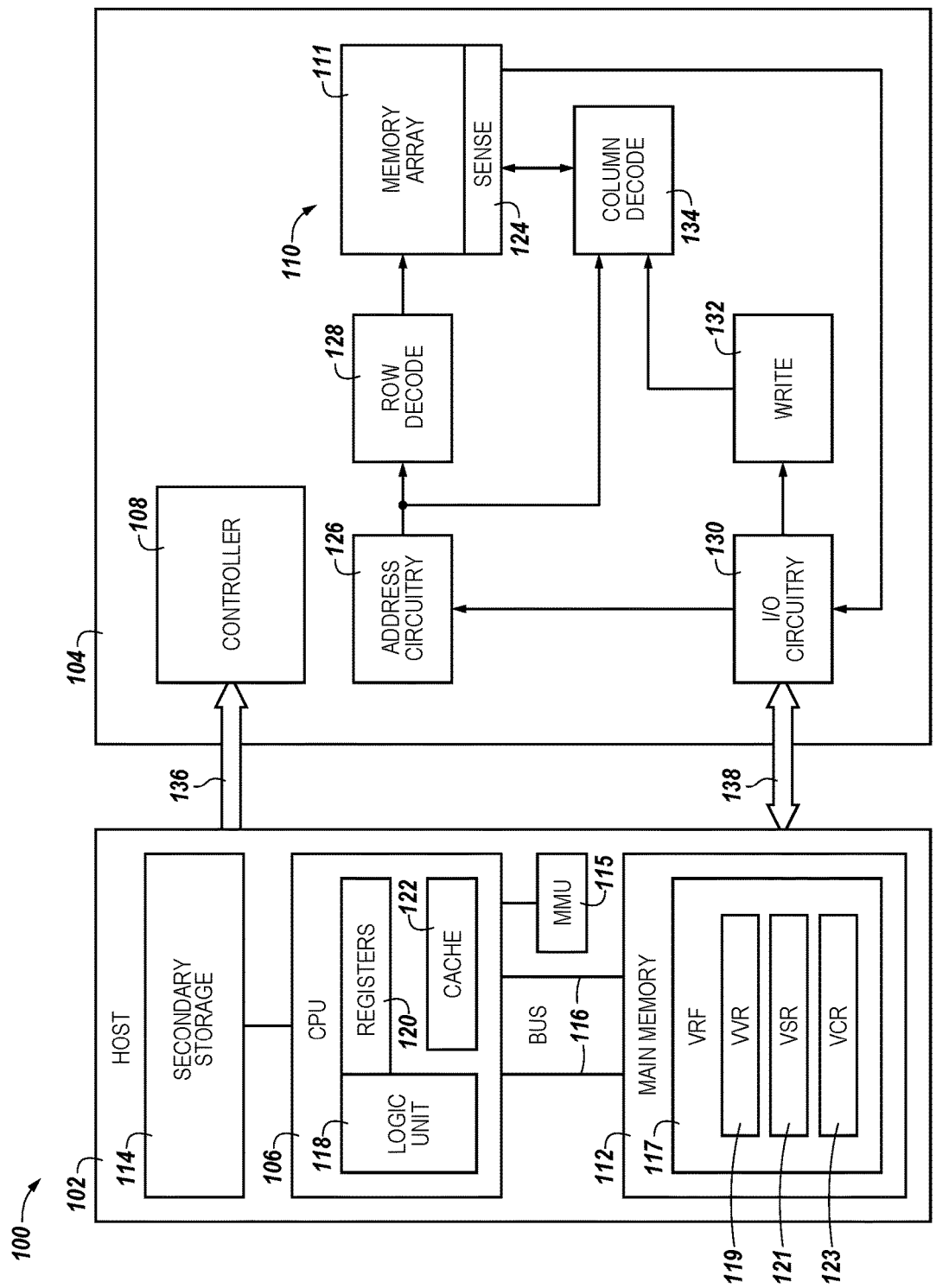
FIG. 1 is a block diagram of an apparatus in the form of a computing system including at least one memory system in accordance with a number of embodiments of the present disclosure.

Given the complexity of modern computer architectures, software programmers and software tool chains (e.g., compilers, debuggers, etc.) can have more difficulty extracting efficient performance from a target platform. Adding processing in memory (PIM) devices can further complicate the architecture. Most modern computer architectures use a register-memory technique, where operations are executed in two separate domains. Logical operations (e.g., arithmetic, flow control, and combinatorial operations) are generally executed on a number of register files. Memory operations (e.g., load, store, etc.) are generally executed on memory devices. Instructions in register-memory architectures utilize register indices or memory addresses to indicate how/where to perform an operation.

PIM computing architectures and/or devices can be classified as memory-memory devices in computing architecture taxonomies. This implies that both logical operations and memory operations are performed on the memory devices in-situ. Instructions in memory-memory architectures use physical addresses to indicate how/where to perform an operation.

Modern applications and operating systems use the notions of relocation and virtual addressing, which imply that an application can be loaded or relocated into different physical memory spaces due to the fact that the actual addressing is virtualized. The application and operating system reside in the virtual address space. The hardware and system architecture dereference these virtual addresses to their physical addresses when memory requests are made. However, any system architecture that includes the use of a PIM device that natively relies on physical addressing conflicts with the notion of virtualizing memory.

Some embodiments of the present disclosure can expose low-level memory functionality provided by a PIM device using a register-memory layer. This layer is referred to herein as a virtual register file. The ability to provide register-memory access to a PIM device significantly decreases the level of customization that would otherwise be used in applications for the PIM device via an optimizing compiler. Otherwise, the applications would be customized for each different kind of PIM device or devices included in a system. Providing optimizing compilers and runtime systems with the ability to target what appears to be a register-memory architecture can greatly simplify an implementation that uses a PIM device. Abstracting the physical addressing mechanisms of a PIM device such that virtual addressing may sufficiently exist without collisions can be beneficial for integrating PIM devices with systems that generally operate on a register-memory architecture.

The present disclosure is related to a virtual register file. Source code can be compiled to include references to a virtual register file for data subject to a logical operation. The references can be dereferenced at runtime to obtain physical addresses of memory device elements according to the virtual register file. The logical operation can be performed in the memory device on data stored in the memory device elements.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designators "M" and "N", particularly with respect to reference numerals in the drawings, indicates that a number of the particular feature so designated can be included. As used herein, "a number of" a particular thing can refer to one or more of such things (e.g., a number of memory devices can refer to one or more memory devices). As used herein, the terms "first" and "second" are used to differentiate between one feature from another and do not necessarily imply an order between the features so designated.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. Multiple analogous elements within one figure may be referenced with a reference numeral followed by a hyphen and another numeral or a letter. For example, 240-1 may reference element 20-1 in FIGS. 2 and 240-N may reference element 40-N, which can be analogous to element 240-1. Such analogous elements may be generally referenced without the hyphen and extra numeral or letter. For example, elements 240-1, . . . , 240-N may be generally referenced as 440. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a block diagram of an apparatus in the form of a computing system 100 including at least one memory system 104 in accordance with a number of embodiments of the present disclosure. As used herein, a host 102, a memory system 104, a memory device 110, a memory array 111, and/or sensing circuitry 124 might also be separately considered an "apparatus."

The computing system 100 can include a host 102 coupled to memory system 104, which includes a memory device 110 (e.g., including a memory array 111 and/or sensing circuitry 124). The host 102 can be a host system such as a personal laptop computer, a desktop computer, a digital camera, a mobile telephone, or a memory card reader, among various other types of hosts. The host 102 can include a system motherboard and/or backplane and can include a number of processing resources (e.g., one or more processors, microprocessors, or some other type of controlling circuitry), such as central processing unit (CPU) 106. The CPU 106 can be coupled to secondary storage 114 and to main memory 112 via a memory bus 116. The secondary storage 114 can be a storage device or other media not directly accessible by the CPU 106 such as hard disk drives, solid state drives, optical disc drives, and can be non-volatile memory. The main memory 112 is directly accessible by the CPU 106. The main memory 112 can be volatile memory such as DRAM. The memory bus 116 can be analogous to the control bus 136 and the I/O bus 138, but for communication between the CPU 106 and the main memory 112 instead of for communication between the host 102 and the memory system 104. The CPU 106 can include a logic unit 118 coupled to a number of registers 120 and cache 122. The cache 122 can be an intermediate stage between the relatively faster registers 120 and the relatively slower main memory 112. Data to be operated on by the CPU 106 may be copied to cache 122 before being placed in a register 120, where the operations can be effected by the logic unit 118. Although not specifically illustrated, the cache 122 can be a multilevel hierarchical cache.

The computing system 100 can include separate integrated circuits or both the host 102 and the memory system 104 can be on the same integrated circuit. The computing system 100 can be, for instance, a server system and/or a high performance computing system and/or a portion thereof. Although the example shown in FIG. 1 illustrates a system having a Von Neumann architecture, embodiments of the present disclosure can be implemented in non-Von Neumann architectures (e.g., a Turing machine), which may not include one or more components (e.g., CPU, ALU, etc.) often associated with a Von Neumann architecture.

For clarity, the computing system 100 has been simplified to focus on features with particular relevance to the present disclosure. The memory array 111 can be a hybrid memory cube (HMC), processing in memory random access memory (PIMRAM) array, DRAM array, SRAM array, STT RAM array, PCRAM array, TRAM array, RRAM array, NAND flash array, and/or NOR flash array, for instance. The memory array 111 can comprise memory cells arranged in rows coupled by access lines (which may be referred to herein as word lines or select lines) and columns coupled by sense lines (which may be referred to herein as digit lines or data lines). Although a single memory device 110 is shown in FIG. 1, embodiments are not so limited. For instance, memory system 104 may include a number of memory devices 110 (e.g., a number of banks of DRAM cells).

The memory system 104 can include address circuitry 126 to latch address signals provided over an I/O bus 138 (e.g., a data bus) through I/O circuitry 130. Address signals can be received and decoded by a row decoder 128 and a column decoder 134 to access the memory device 110. Data can be read from the memory array 111 by sensing voltage and/or current changes on the sense lines using sensing circuitry 124. The sensing circuitry 124 can read and latch a page (e.g., row) of data from the memory array 111. The I/O circuitry 130 can be used for bi-directional data communication with host 102 over the I/O bus 138. The write circuitry 132 can be used to write data to the memory device 110.

Controller 108 can decode signals provided by control bus 136 from the host 102. These signals can include chip enable signals, write enable signals, and address latch signals that are used to control memory operations performed on the memory device 110, including data read, data write, and data erase operations. The signals can also be used to control logical operations performed on the memory device 110 including arithmetic, flow control, and combinatorial operations, among others. In various embodiments, the controller 108 is responsible for executing instructions from the host 102. The controller 108 can be a state machine, a sequencer, a processor, and/or other control circuitry.

An example of the sensing circuitry 124 is described further below in association with FIG. 2. For instance, in a number of embodiments, the sensing circuitry 124 can comprise a number of sense amplifiers and a number of compute components, which may comprise a latch serving as an accumulator and that can be used to perform logical operations (e.g., on data associated with complementary sense lines). Logical operations can include Boolean operations (e.g., AND, OR, NOR, XOR, etc.), combinations of Boolean operations to perform other mathematical operations, as well as non-Boolean operations. In a number of embodiments, the sensing circuitry 124 can be used to perform logical operations using data stored in the memory array 111 as inputs and store the results of the logical operations back to the memory array 111 without transferring via a sense line address access (e.g., without firing a column decode signal). As such, a logical operation can be performed using sensing circuitry 124 rather than and/or in addition to being performed by processing resources external to the sensing circuitry 124 (e.g., by the host CPU 106 and/or other processing circuitry, such as ALU circuitry, located on the memory system 104, such as on the controller 108, or elsewhere).

In various previous approaches, data associated with a logical operation, for instance, would be read from memory via sensing circuitry and provided to registers 120 associated with the host CPU 106. A logic unit 118 of the host CPU 106 would perform the logical operations using the data (which may be referred to as operands or inputs) from the memory array 111 in the registers 120 and the result could be transferred back to the memory array 111 via the local I/O lines. In contrast, in a number of embodiments of the present disclosure, sensing circuitry 124 can be configured to perform a logical operation on data stored in memory cells in memory array 111 and store the result back to the array 111 without enabling a local I/O line coupled to the sensing circuitry and without using registers 120 of the host CPU 106.

As such, in a number of embodiments, registers 126 and/or a logic unit 118 of a host CPU 106 external to the memory array 111 and sensing circuitry 124 may not be needed to perform the logical operation as the sensing circuitry 124 can be operated to perform the logical operation using the address space of memory array 111. Additionally, the logical operation can be performed without the use of an external processing resource.

The host 102 can be configured with an operating system. The host 102 can be coupled to the memory device 110 (e.g., via the control bus 136 and/or the I/O bus 138). The operating system is executable instructions (software) that manages hardware resources and provides services other executable instructions (applications) that run on the operating system. The operating system can implement a virtual memory system.

According to the present disclosure, the CPU 106 can execute instructions to define a buffer in the main memory 112 of the host 102 with sufficient space to contain backing storage for a virtual register file (VRF) 117. The instructions can be executed to logically split the buffer into a number of virtual vector registers (VVR) 119, a number virtual scalar registers (VSR) 121, and a number of virtual control registers (VCR) 123, among other virtualized components as described herein, which collectively define the virtual register file 117. The host 102 can create the virtual register file 117 at runtime. These virtual registers 119, 121, 123 can represent a number of the registers 120 of the CPU 106 (e.g., physical vector registers, physical scalar registers, and/or physical control registers) for logical operations to be performed in the memory device 110. The virtual registers can represent physical registers 120 of the CPU 106 with respective indices to the virtual register file 117 at compile time as described in more detail in association with FIG. 3. The virtual register file 117, specifically, the virtual vector registers 119 can store virtual addresses (e.g., base virtual addresses) of elements of the memory device 110 (e.g., the PIM memory device 110 illustrated in FIG. 1). A memory element (also referred to as a computational element) stores an amount of data that is operated on in one logical operation. The memory element can refer to a number of memory cells that store the amount of data. Memory-memory architectures may be prohibitively difficult to expose to high performance software and compiler implementations.

In some embodiments, the host 102 can include a memory management unit (MMU) 115. The MMU 115 is a hardware component that can perform translation between virtual memory addresses and physical memory addresses. That is, the MMU 115 can translate the virtual memory addresses stored in the virtual register file 117 to physical addresses of the elements of the memory device 110. Thus, the virtual register file 117 does not store the physical addresses of the elements of the memory device 110. In this regard, the virtual register file 117 does not need to be updated when data is moved within the memory device 110. Furthermore, unlike physical registers 120 associated with the CPU 106 for operations on data stored in the main memory 112, the virtual registers in the virtual register file 117 do not receive or store data corresponding to the elements of the memory device 110.

Figure 2:
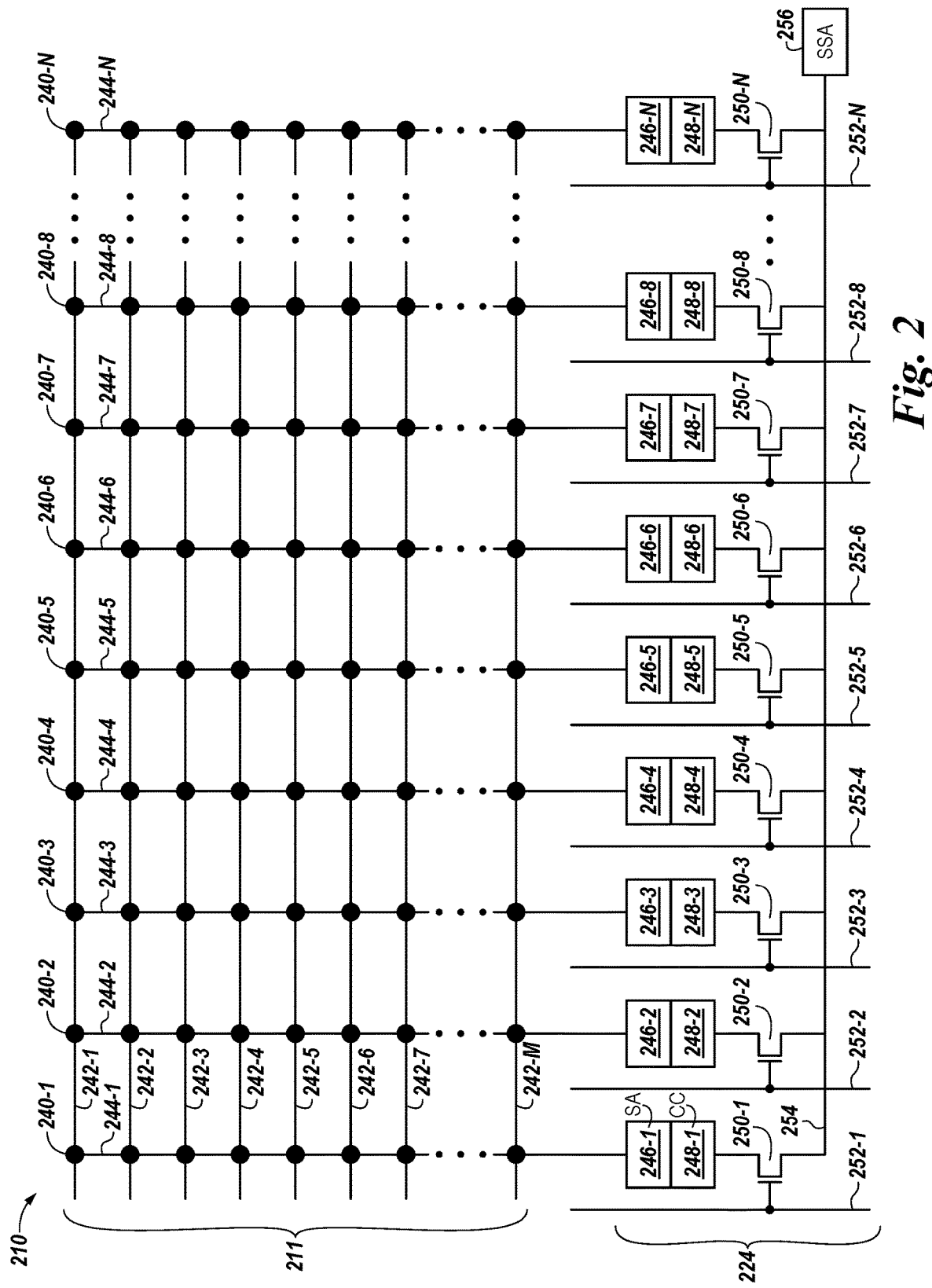
FIG. 2 is a schematic diagram of a portion of a memory device in accordance with a number of embodiments of the present disclosure.

FIG. 2 is a schematic diagram of a portion of a memory device 210 in accordance with a number of embodiments of the present disclosure. The memory device 210 is analogous to the memory device 110 illustrated in FIG. 1. The memory device 210 can include a memory array 211 that includes memory cells 240-1, 240-2, 240-3, 240-4, 240-5, 240-6, 240-7, 240-8, . . . , 240-N coupled to rows of access lines 242-1, 242-2, 242-3, 242-4, 242-5, 242-6, 242-7, . . . , 242-M and columns of sense lines 244-1, 244-2, 244-3, 244-4, 244-5, 244-6, 244-7, 244-8, . . . , 244-N. The memory array 211 is not limited to a particular number of access lines and/or sense lines, and use of the terms "rows" and "columns" does not intend a particular physical structure and/or orientation of the access lines and/or sense lines. Although not pictured, each column of memory cells can be associated with a corresponding pair of complementary sense lines.

Each column of memory cells can be coupled to sensing circuitry 224, which can be analogous to sensing circuitry 124 illustrated in FIG. 1. In this example, the sensing circuitry includes a number of sense amplifiers 246-1, 246-2, 246-3, 246-4, 246-5, 246-6, 246-7, 246-8, . . . , 246-N coupled to the respective sense lines 244. The sense amplifiers 246 are coupled to input/output (I/O) line 254 (e.g., a local I/O line) via access devices (e.g., transistors) 250-1, 250-2, 250-3, 250-4, 250-5, 250-6, 250-7, 250-8, . . . , 250-N. In this example, the sensing circuitry also includes a number of compute components 248-1, 248-2, 248-3, 248-4, 248-5, 248-6, 248-7, 248-8, . . . , 248-N coupled to the respective sense lines 244. Column decode lines 252-1, 252-2, 252-3, 252-4, 252-5, 252-6, 252-7, 252-8, . . . , 252-N are coupled to the gates of access devices 250 respectively, and can be selectively activated to transfer data sensed by respective sense amps 246 and/or stored in respective compute components 248 to a secondary sense amplifier 256. In a number of embodiments, the compute components 248 can be formed on pitch with the memory cells of their corresponding columns and/or with the corresponding sense amplifiers 246.

In a number of embodiments, the sensing circuitry (e.g., compute components 248 and sense amplifiers 246) is configured to perform a number of logical operations on elements stored in array 211. As an example, a first plurality of elements can be stored in a first group of memory cells coupled to a particular access line (e.g., access line 242-1) and to a number of sense lines 244, and a second plurality of elements can be stored in a second group of memory cells coupled to a different access line (e.g., access line 242-2) and the respective number of sense lines 244. Each element of the first plurality of elements can have a logical operation performed thereon with a respective one of the second plurality of elements, and the result of the logical operation can be stored (e.g., as a bit-vector) in a third group of memory cells coupled to a particular access line (e.g., access line 242-3) and to the number of sense lines 244.

Figure 3:
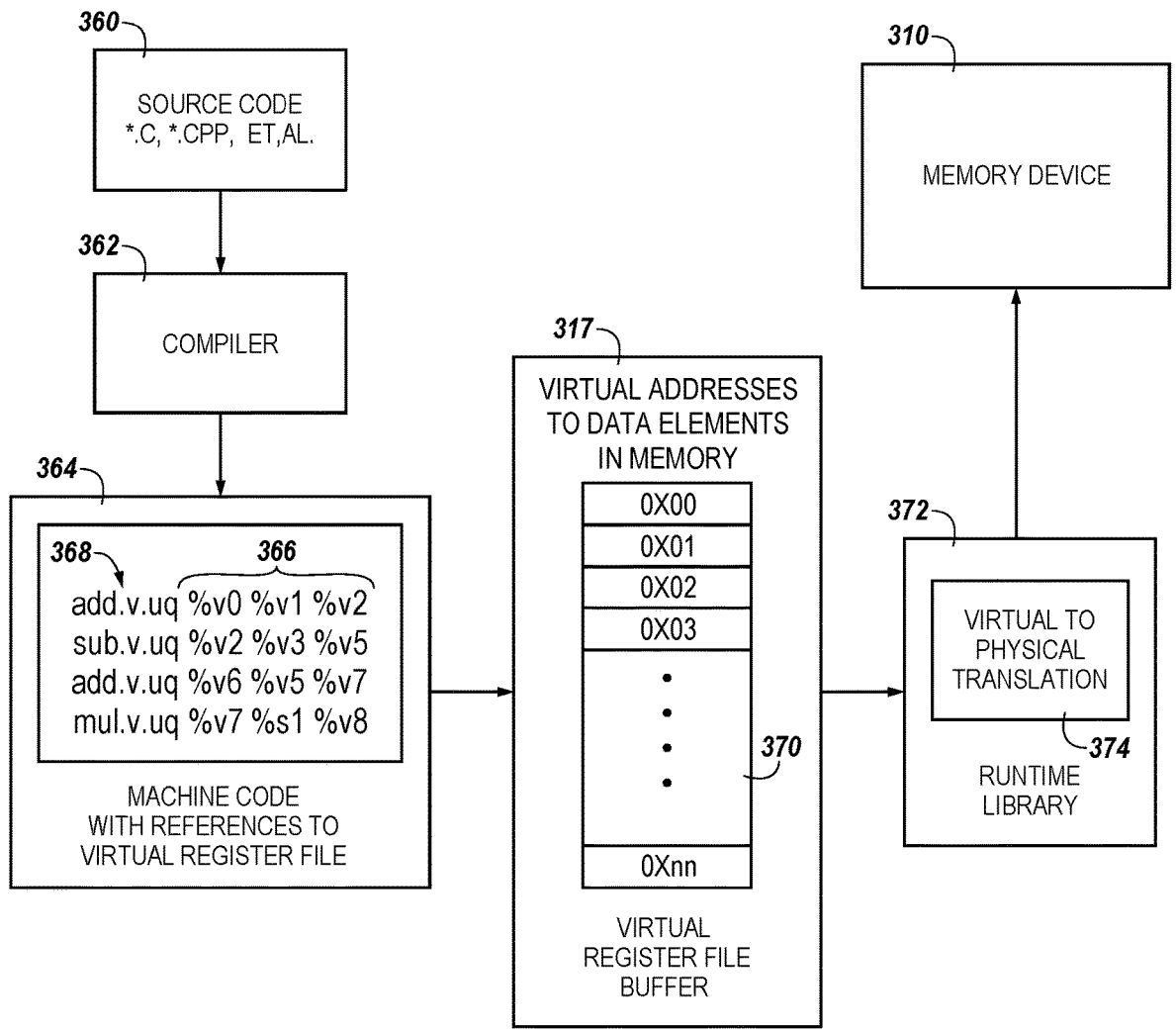
FIG. 3 is a block diagram illustrating virtual register file memory translation according to a number of embodiments of the present disclosure.

FIG. 3 is a block diagram illustrating virtual register file memory translation according to a number of embodiments of the present disclosure. The host (e.g., host 102 illustrated in FIG. 1) can compile source code 360, such as C, C++, etc., with a compiler 362. The source code 360 can be compiled to include references to a virtual register file 317 for data subject to a logical operation. The compiler 362 can be configured to emit compiled code 364 (e.g., machine code, object code, etc.) with references to the virtual register file 317 in terms of indices to virtual vector registers in the virtual register file 317. The source code 360 can be compiled to target the virtual register file 317 for logical operations to be performed in the memory device 310 as though the logical operations were to be performed in the virtual register file 317 on the host (e.g., host 102 illustrated in FIG. 1). That is, the virtual register file 317 can be targeted as though it was a physical register (e.g., physical register 120 illustrated in FIG. 1) for the host device even though the actual logical operation is to be performed in the memory device 310 on the memory system (e.g., memory system 104 illustrated in FIG. 1).

In order to provide functionality for programmers and compilers to generate code for the memory device 310, the virtual register file 317 is defined as the basis for the mapping between virtualized memory devices and the actual processing and memory hardware. Some previous source code compiler technology was made aware of or targeted a fixed set of mutable (changeable) hardware elements for the purpose of safe code generation. This hardware would generally include computational elements (e.g., logic unit 118 illustrated in FIG. 1) and register files (e.g., registers 120 illustrated in FIG. 1). However, the memory device 310 does not have mutable register files. Operations are to be performed at or near the physical row and column intersection of the memory array (e.g., memory array 111 illustrated in FIG. 1) or in the in-situ storage in the memory device (e.g., memory device 110 illustrated in FIG. 1). If the memory device 310 were to function according to some previous compiler approaches, each memory cell in the memory device 310 would become a mutable and allocable hardware element, which could prevent applications from executing alongside one another in virtual memory.

The virtual register file 317 can virtualize access to the memory cells of the memory device 310. The virtual register file 317 can be stored in a buffer in memory (e.g., main memory 112 of a host 102 illustrated in FIG. 1) and can function similar to a register file, except that the actual data to be operated on is not transferred to the virtual register file 317, or even to the host, because the operation is to be performed in the memory device 310 at runtime, rather than performing the logical operation with the host. The virtual register file 317 can be configured to store addresses of respective target elements rather than the actual data. There is no motivation to virtualize a physical register used according to some previous approaches because the physical register receives the data to be operated on by a logic unit of the host.

The entries in the virtual register file 317 can be translated at runtime from virtual address contents to respective physical addresses such that steps can be taken to initiate a logical operation using the memory device 310. Each element of the buffer that provides the backing storage for the virtual register file can be of a particular size (e.g., 64 bits) such that the buffer may be indexed analogously to a register file according to some previous approaches. The compiler 362 can be configured to target the virtual register file 317 as opposed to physical hardware entities (e.g., registers 120 illustrated in FIG. 1) for operations to be performed in the memory device 310.

The compiled code 364 can include logical operations 368 and references 366 to the virtual register file 317, however the compiled code will not include a physical address corresponding to the virtual address associated with the virtual vector register. Some examples of the logical operations include add, subtract, multiply, etc. A particular reference 366 can be an index (e.g., % v0, % v1, . . . , etc.) to the virtual register file 317. A particular index can point to a virtual register in the virtual register file 317, such as a virtual vector register, a virtual scalar register, and/or a virtual control register, among others.

A respective index to the virtual register file 317 can represent a vector register or a scalar register with a fixed amount of backing storage of the virtual register file 317. A respective index to the virtual register file 317 can represent a control register with a variable amount of the backing storage. Virtual addresses for elements of the memory device 310 can be stored in virtual vector registers of the virtual register file 317.

At runtime, the references to the virtual register file can be dereferenced (e.g., by virtual to physical translation 374) to obtain physical address of memory device elements. The dereferencing (e.g., virtual to physical translation 374) can include use of the runtime environment of the memory device 310 and/or use of a memory management unit of the host (e.g., the MMU 115 of the host 102 illustrated in FIG. 1). The logical operation can then be performed in the memory device 310 on data that was stored in the memory device elements.

In some embodiments, the virtual register file 317 can also be used for memory operations (in addition to logical operations). For example, the source code 360 can be compiled to include a reference to the virtual register file 317 for data subject to a memory operation. The reference to the virtual register file can be dereferenced at runtime to obtain a physical address of a memory device element according to the virtual register file 317.

The following table illustrates an example of a virtual register file structure including indices, mnemonics, and descriptions of a number of components of the virtual register file:

TABLE 1

| Index | Mnemonic | Description |
| --- | --- | --- |
| 0x00-0x0F | T0-T15 | Temporary Row Registers |
| 0x14-0x17 | B0-B3 | Bank Registers |
| 0x1A | CB | Bank Control Register |
| 0x1B | ACC0 | Accumulator |
| 0x20-0x3F | V0-V31 | Vector Registers |
| 0x40-0x5F | S0-S31 | Scalar Registers |
| 0x60 | VL | Vector Length (in elements) |
| 0x61 | VS | Vector Stride (in bits) |
| 0x62 | VF | Vector First |
| 0x63 | AB | Arbitrary Bit Integer Width (in bits) |
| 0x64 | FRAC | Arbitrary Float/Fixed Fractional Width (in bits) |
| 0x65 | EXP | Arbitrary Float/Fixed Exponent Width (in bits) |
| 0x66 | SP | Stack Pointer |
| 0x67 | FP | Frame Pointer |
| 0x68 | RP | Return Pointer |
| 0x69 | AP | Argument Pointer |
| 0x6A | EMASK | Exception Mask |
| 0x6B | DMASK | Device Mask |
| 0x6C | BMASK | Bank Mask |
| 0x70 | MAXROW | Number of rows in subarray |
| 0x71 | MAXCOL | Number of columns in subarray |
| 0x72 | MAXSA | Number of subarrays in bank |
| 0x73 | MAXBANK | Number of banks in device |
| 0x74 | MAXDEV | Number of devices in system |
| 0x75 | MAXTMP | Number of temporary rows in subarray |
| 0x76 | VLMAX.H | Maximum horizontal vector length (in bits) |
| 0x77 | VMLAX.V | Maximum vertical vector length (in bits) |
| 0x78 | CONFIG | Config register |

Although not specifically illustrated in the table above, the virtual register file 317 can store virtual addresses corresponding to physical addresses of elements of the memory device 310. In some embodiments, the virtual memory address can be a base virtual memory address, which in combination with a stored stride of memory device elements and a length of memory device elements together with the translated base virtual address, define which memory device elements correspond to the virtual vector register that stores the virtual memory address. However, the virtual register file 317 does not store physical addresses of the elements of the memory device 310.

Virtual to physical translation 374 can occur at runtime according to the runtime library 372, which can be part of the runtime environment of the host and/or the memory device 310. The translation can occur in response to a command calling for a logical operation to be performed in the memory device 310. For example, the compiled source code 364 can be executed to cause the logical operation to be performed in the memory device. The logical operation can be initialized according to a portion of the compiled source code 364 that addresses a particular virtual address. The logical operation can be performed in the memory device 310 on data stored in a particular physical address corresponding to the particular virtual address.

The runtime library 372 can be loaded by an application running on the host. For example, the runtime library 372 and the virtual register file 317 can be loaded into main memory of the host. Although not specifically illustrated as such, the runtime library 372 can create and/or contain the virtual register file 317 including virtual memory addresses of memory device elements. In some embodiments, each running thread can be associated with one virtual register file 317. The virtual register file 317 can be mapped to a particular memory bank of the memory device 310 at runtime, but can later be mapped to a different bank. For example, the memory device 310 can include multiple banks, each including a number of subarrays. The application that is running on the host can be relocated in the main memory of the host without editing the virtual register file 317, while maintaining the functionality provided by the virtual register file 317.

Although not specifically illustrated as such, a non-transitory computing device readable medium for storing executable instructions can include all forms of volatile and non-volatile memory, including, by way of example, semiconductor memory devices, DRAM, PIM, HMC, EPROM, EEPROM, flash memory devices, magnetic disks such as fixed, floppy, and removable disks, other magnetic media including tape, optical media such as compact discs (CDs), digital versatile discs (DVDs), and Blu-Ray discs (BD). The instructions may be supplemented by, or incorporated in, ASICs. For example, any one or more of the secondary storage 114, the registers 120, the cache 122, the main memory 112, and/or the memory array 111 illustrated in FIG. 1, can be a non-transitory computing device readable medium.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A non-transitory computer readable medium storing instructions executable by a processor to:
   define a buffer in host memory with sufficient space to contain backing storage for a virtual register file;
   logically split the buffer into virtual vector registers, virtual scalar registers, and virtual control registers, collectively comprising the virtual register file; and
   represent a vector register, a scalar register, and a control register with a respective index to the virtual register file at compile time.

2. The medium of claim 1, including instructions to reference the vector register and the virtual scalar register with a respective index to the virtual register file for a fixed amount of the backing storage.

3. The medium of claim 1, including instructions to reference the control register with a respective index to the virtual register file for a variable amount of the backing storage.

4. The medium of claim 1, including instructions to store a base virtual address of a memory device element in the virtual vector register.

5. A method, comprising:
   defining a buffer in host memory with sufficient space to contain backing storage for a virtual register file;
   logically splitting the buffer into virtual vector registers, virtual scalar registers, and virtual control registers, collectively comprising the virtual register file; and
   representing a vector register, a scalar register, and a control register with a respective index to the virtual register file at compile time.

6. The method of claim 5, further comprising referencing the vector register and the virtual scalar register with a respective index to the virtual register file for a fixed amount of the backing storage.

7. The method of claim 5, further comprising referencing the control register with a respective index to the virtual register file for a variable amount of the backing storage.

8. The method of claim 5, further comprising storing a base virtual address of a memory device element in the virtual vector register.

9. An apparatus, comprising:
   a processor; and
   memory coupled to the processor;
   wherein the processor is configured to:
      define a buffer in the memory with sufficient space to contain backing storage for a virtual register file;
      logically split the buffer into virtual vector registers, virtual scalar registers, and virtual control registers, collectively comprising the virtual register file; and
      represent a vector register, a scalar register, and a control register with a respective index to the virtual register file at compile time.

10. The apparatus of claim 9, wherein the processor is further configured to reference the vector register and the virtual scalar register with a respective index to the virtual register file for a fixed amount of the backing storage.

11. The apparatus of claim 9, wherein the processor is further configured to reference the control register with a respective index to the virtual register file for a variable amount of the backing storage.

12. The apparatus of claim 9, wherein the processor is further configured to store a base virtual address of an external memory device element in the virtual vector register.

* * * * *